(12) United States Patent
Teranoshita

(10) Patent No.: US 10,037,182 B2
(45) Date of Patent: Jul. 31, 2018

(54) SERVER APPARATUS THAT DISTRIBUTES PRINT DATA, MANAGEMENT METHOD OF PRINT DATA, AND STORAGE MEDIA

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Masahide Teranoshita, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/844,800

(22) Filed: Dec. 18, 2017

(65) Prior Publication Data

US 2018/0107437 A1   Apr. 19, 2018

Related U.S. Application Data

(63) Continuation of application No. 15/172,337, filed on Jun. 3, 2016, now Pat. No. 9,891,877.

(30) Foreign Application Priority Data

Jul. 25, 2015   (EP) ..................................... 15178344

(51) Int. Cl.
  *G06K 15/00* (2006.01)
  *G06F 3/12* (2006.01)
  *H04N 1/44* (2006.01)

(52) U.S. Cl.
  CPC .......... *G06F 3/1289* (2013.01); *G06F 3/1238* (2013.01); *H04N 1/4413* (2013.01); *H04N 1/4426* (2013.01); *H04N 2201/3226* (2013.01)

(58) Field of Classification Search
  CPC ... G06F 3/1289; G06F 3/1238; H04N 1/4413; H04N 1/4426; H04N 2201/3226

(Continued)

(56) References Cited

U.S. PATENT DOCUMENTS 8,056,140 B2   11/2011   Fukuta
9,407,624 B1 *   8/2016   Myers ..................... H04L 63/08

(Continued)

OTHER PUBLICATIONS

Non-Final Office Action for U.S. Appl. No. 15/172,337 dated Dec. 15, 2016, 26 Pages.

(Continued)

*Primary Examiner* — Neil R McLean
(74) *Attorney, Agent, or Firm* — Amin, Turocy & Watson LLP

(57) ABSTRACT

According to an embodiment, a server apparatus includes a storage unit and a control unit. The storage unit correlates print data to a user ID of which a user registers the print data, and stores the correlated print data. The control unit performs controlling such that when the control unit receives a preparation instruction of a sharing access code from a display operating unit, the control unit correlates the sharing access code to a print data designated among the print data registered by the user, and causes the correlated result to be stored in the storage unit. When the control unit receives designation of the sharing access code from the display operating unit, the control unit reads out information relating to the print data correlated to the sharing access code from the storage unit, and causes the read-out information to be displayed on the display operating unit.

4 Claims, 11 Drawing Sheets

(58) Field of Classification Search
USPC .......................................................... 358/1.14
See application file for complete search history.

(56) References Cited

U.S. PATENT DOCUMENTS

| | | |
|---|---|---|
| 2006/0290967 A1 | 12/2006 | Sumitomo et al. |
| 2010/0182643 A1 | 7/2010 | Ito |
| 2015/0022846 A1* | 1/2015 | Nishida ................ H04N 1/4433 358/1.14 |
| 2015/0142573 A1* | 5/2015 | Chien ................ H04N 1/00153 705/14.58 |

OTHER PUBLICATIONS

Non-Final Office Action for U.S. Appl. No. 15/172,337 dated Jun. 19, 2017, 28 Pages.

* cited by examiner

FIG. 6

| UNIQUE ID | REGISTERED USER ID | SHARING ACCESS CODE | CODE ISSUE TIME | DOCUMENT NAME | PATH | REGISTER TIME |
|---|---|---|---|---|---|---|
| 1 | AAAAA | <NULL> | <NULL> | A111 | /prtdata/A111.pm | 2014/11/11 12:00 |
| 2 | AAAAA | <NULL> | <NULL> | B222 | /prtdata/B222.pm | 2014/11/11 13:00 |
| 3 | AAAAA | <NULL> | <NULL> | C333 | /prtdata/C333.pm | 2014/11/11 14:00 |
| 4 | BBBBB | <NULL> | <NULL> | D444 | /prtdata/D444.pm | 2014/11/11 12:00 |
| 5 | BBBBB | <NULL> | <NULL> | E555 | /prtdata/E555.pm | 2014/11/11 13:00 |

FIG. 7

| UNIQUE ID | REGISTERED USER ID | SHARING ACCESS CODE | CODE ISSUE TIME | DOCUMENT NAME | PATH | REGISTER TIME |
|---|---|---|---|---|---|---|
| 1 | AAAAA | 111-222-333 | 2014/11/11 12:30 | A111 | /prtdata/A111.pm | 2014/11/11 12:00 |
| 2 | AAAAA | <NULL> | <NULL> | B222 | /prtdata/B222.pm | 2014/11/11 13:00 |
| 3 | AAAAA | <NULL> | <NULL> | C333 | /prtdata/C333.pm | 2014/11/11 14:00 |
| 4 | BBBBB | <NULL> | <NULL> | D444 | /prtdata/D444.pm | 2014/11/11 12:00 |
| 5 | BBBBB | <NULL> | <NULL> | E555 | /prtdata/E555.pm | 2014/11/11 13:00 |

FIG. 8

| UNIQUE ID | REGISTERED USER ID | SHARING ACCESS CODE | CODE ISSUE TIME | DOCUMENT NAME | PATH | REGISTER TIME |
|---|---|---|---|---|---|---|
| 1 | AAAAA | 111-222-333 | 2014/11/11 13:30 | A111 | /prtdata/A111.pm | 2014/11/11 12:00 |
| 2 | AAAAA | 111-222-333 | 2014/11/11 13:30 | B222 | /prtdata/B222.pm | 2014/11/11 13:00 |
| 3 | AAAAA | <NULL> | <NULL> | C333 | /prtdata/C333.pm | 2014/11/11 14:00 |
| 4 | BBBBB | <NULL> | <NULL> | D444 | /prtdata/D444.pm | 2014/11/11 12:00 |
| 5 | BBBBB | <NULL> | <NULL> | E555 | /prtdata/E555.pm | 2014/11/11 13:00 |

FIG. 9

| UNIQUE ID | REGISTERED USER ID | SHARING ACCESS CODE | CODE ISSUE TIME | DOCUMENT NAME | PATH | REGISTER TIME |
|---|---|---|---|---|---|---|
| 1 | AAAAA | 111-222-333 | 2014/11/11 13:30 | A111 | /prtdata/A111.pm | 2014/11/11 12:00 |
| 2 | AAAAA | 111-222-333 | 2014/11/11 13:30 | B222 | /prtdata/B222.pm | 2014/11/11 13:00 |
| 3 | AAAAA | 222-333-444 | 2014/11/11 14:30 | C333 | /prtdata/C333.pm | 2014/11/11 14:00 |
| 4 | BBBBB | <NULL> | <NULL> | D444 | /prtdata/D444.pm | 2014/11/11 12:00 |
| 5 | BBBBB | <NULL> | <NULL> | E555 | /prtdata/E555.pm | 2014/11/11 13:00 |

SERVER APPARATUS THAT DISTRIBUTES PRINT DATA, MANAGEMENT METHOD OF PRINT DATA, AND STORAGE MEDIA

CROSS-REFERENCE TO RELATED APPLICATION

This application is a Continuation of application Ser. No. 15/172, 337 filed on Jun. 3, 2016, the entire contents of which are incorporated herein by reference.

This application is based upon and claims the benefit of priority from European Patent Application 15178344.6 filed on Jul. 25, 2015, the entire contents of which are incorporated herein by reference.

FIELD

Embodiments described herein relate generally to a technique in which print data stored in a server is shared with other parties.

BACKGROUND

There is a system that is capable of performing a location-free printing. In the location-free printing, print data is transmitted to a multifunction peripheral (MFP) of a server or a base unit functioning as the server, and the printing is performed in a certain MFP (peripheral device) connected to the server.

When an access is granted/performed to the print data stored in a server, because the access controlling is granted/performed using a registered user ID, only a registered user may perform the printing.

However, in this case, there is a problem in that it is difficult to share registered print data with another party, even if the sharing is desirable.

DESCRIPTION OF THE DRAWINGS

FIG. 6 is a diagram showing an example of when a sharing access code is prepared.

FIG. 7 is a diagram showing an example of when a sharing access code is added to other document.

FIG. 8 is a diagram showing an example of when other sharing access code is added.

FIG. 9 is a diagram showing a display example in a display unit when a retrieve is performed using a sharing access code.

DETAILED DESCRIPTION

In general, according to one embodiment, a server apparatus, to which a plurality of image forming apparatuses are connected through a network, includes a storage unit and a control unit. The storage unit correlates print data, which is printed by the image forming apparatus, to a user ID of which a user registers the print data, and stores the correlated print data. The control unit performs controlling such that when the control unit receives a preparation instruction of a sharing access code from a display operating unit, the control unit correlates the sharing access code to a print data designated among the print data registered by the user, and causes the correlated result to be stored in the storage unit. Further, when the control unit receives designation of the sharing access code from a display operating unit, the control unit reads out information relating to the print data correlated to the sharing access code from the storage unit, and causes the read-out information to be displayed on the display operating unit.

In the embodiment, a sharing access code is issued to the print data which is intended to be shared, the code is shared with another user, and thus the other user may have access to the print data.

A user who allows sharing of the user's print data with another party, prepares a sharing access code during or after printing, and notifies the other parties, with whom the user wants to share the print data, of the sharing access code. Alternatively, a user who wants to obtain an allowance of another party's print data may acquire a sharing access code for the print data which is requested to be shared.

In the system according the embodiment, one or plural pieces of print data correlated to a sharing access code may be provided. Further, a registrant of print data may delete a sharing access code once correlated to the print data and thus cancel the sharing thereof. The user who allows the sharing may print the shared print data in an MFP.

In other words, a registrant of print data may perform issuing of a sharing access code, correlating of the sharing access code to the print data, and cancelling of the sharing. Another party may have access to the print data and perform the printing based on the sharing access code.

According to such a configuration, for example, when a first party prepares data and asks a second party to print the prepared data, the first party notifies the second party of a sharing access code so that the second party also may print the prepared data, and thus it is possible to improve convenience in use.

Hereinafter, an aspect of the embodiment is described with reference to the drawings.

Figure 1:
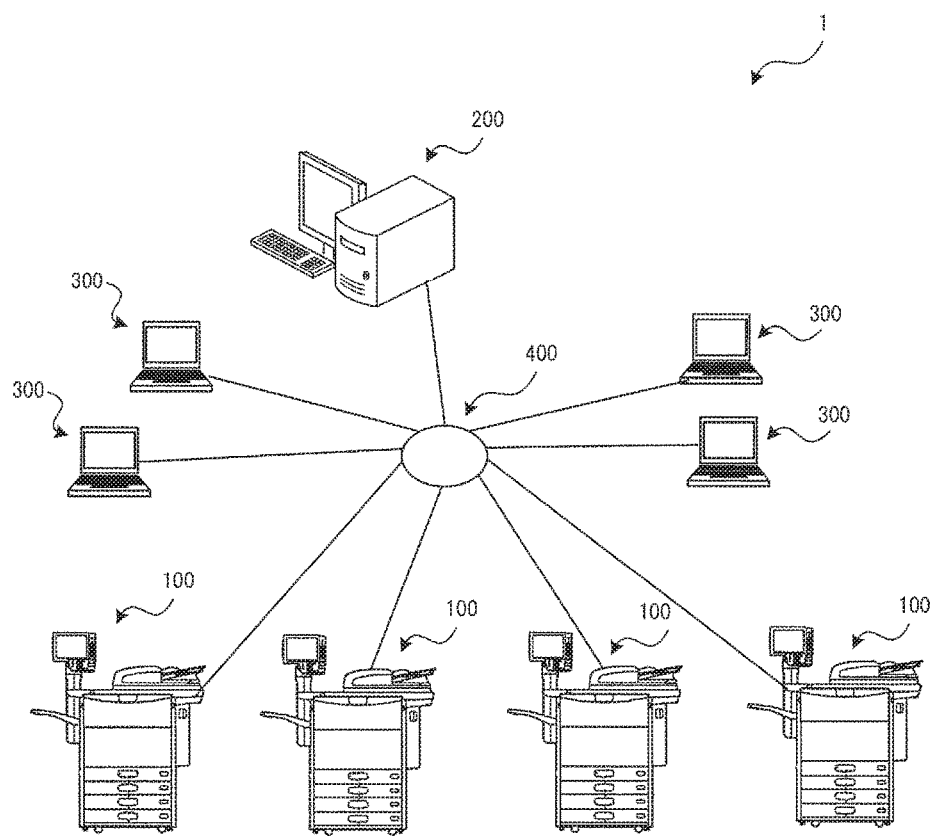
FIG. 1 is a diagram showing a configuration example of a print system according to an embodiment.

FIG. 1 is a diagram showing an example configuration of a system according to one embodiment. A print system 1 includes a plurality of image forming apparatuses 100, a server apparatus 200, and a plurality of client apparatuses 300, which perform data transmission and reception through an interconnected network 400 with each other. The network can be hard waired, wireless, or a combination thereof.

The server apparatus 200 receives print data from a client apparatus 300 which may be a computer used by a user, and transmits the print data to any of the plurality of the image forming apparatuses 100. The server apparatus 200 performs a user authentication to determine whether or not there is usability thereof. The server apparatus 200 stores user identification information (user ID) and a password, and performs the authentication using data of the user identification information and the password. The server apparatus 200 may be a substantial unit which is capable of acquiring a result that is generated due to the authentication processing of another apparatus.

An image forming apparatus 100 may be an MFP which has a print function, a copy function, a transmission and reception functions of a facsimile, and a scan function. The image forming apparatus 100 receives the print data distributed by the server apparatus 200, and performs printing according to a set value included in the print data.

Each client apparatus 300 may be a computer used by a unique and/or different user and is capable of performing editing, looking-up and the like of documents, image data, and the like. Further, when a user provides a print instruction, the client apparatus 300 converts a target document and the like to a print data and transmits the print data to the server apparatus 200.

Figure 2:
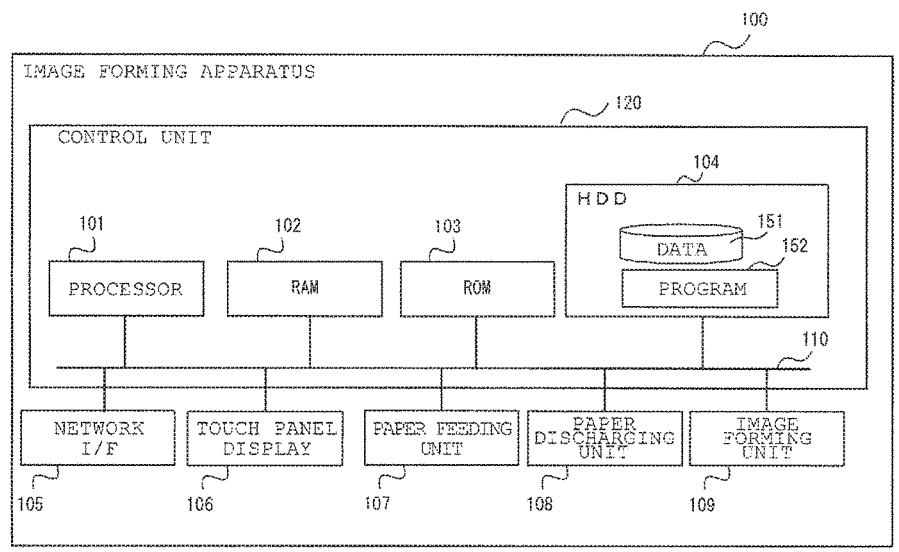
FIG. 2 is a block diagram showing a configuration example of an image forming apparatus according to the embodiment.

FIG. 2 is a block diagram showing an example configuration of the image forming apparatus 100. The image forming apparatus 100 includes a processor 101, a random access memory (RAM) 102, a read only memory (ROM) 103, a hard disk drive (HDD) 104, a network I/F 105, a touch panel display 106, a paper feeding unit 107, a paper discharging unit 108, and an image forming unit 109, which perform inputting and outputting of signals or data with each other through a bus 110. Further, the control unit 120 includes the processor 101, the RAM 102, the ROM 103, the HDD 104 and the bus 110.

The processor 101 corresponds to a computing apparatus such as a central processing unit (CPU). The processor 101 distributes a program stored in the ROM 103 or a program 152 stored in the HDD 104 to the RAM 102 and executes a computing to provide various functions in collaboration with each piece of hardware. The RAM 102 is a main storage device, and the ROM 103 is a device that stores a system program and the like in a nonvolatile manner. The HDD 104 is an auxiliary storage device that stores data or programs in a nonvolatile manner, and stores a program 152 and data 151.

The network I/F 105 includes a network interface card which is based on a standard of a wired communication/a wireless communication, and directly controls transmission and reception of data which is generated between external devices and the network I/F.

The touch panel display 106 includes a flat type liquid crystal screen (display unit) and a touch panel (an input unit). The touch panel display 106 is configured such that the touch panel is stacked on the liquid crystal screen. The touch panel display 106 is a unit which is directly contacted or pushed by a finger tip or a pen tip to be capable of performing an inputting operation.

The paper feeding unit 107 includes a tray or cassette on which sheets are stacked and a pickup roller that supplies the stacked sheets to an image forming apparatus 100. A paper discharging unit 108 stacks sheets on which images are formed in the internal portion of the main body of the image forming apparatus 100. The image forming unit 109 is a unit that uses print data received from the server apparatus 200 or original sheets provided on an auto document feeder (ADF) to form image on a sheet supplied from the paper feeding unit 107 and transports the sheet to the paper discharging unit 108.

Figure 3:
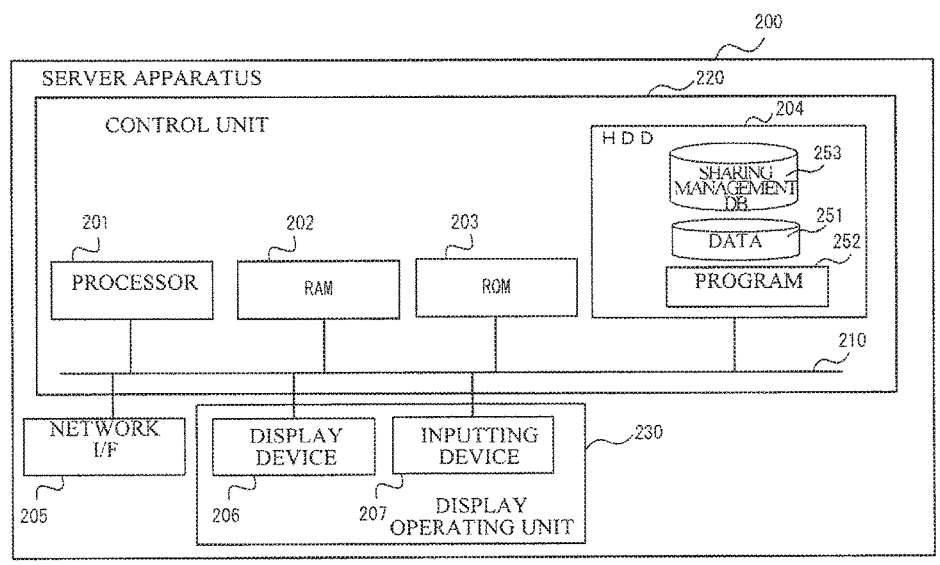
FIG. 3 is a block diagram showing a configuration example of a server apparatus according to the embodiment.

FIG. 3 is a block diagram showing an example configuration of a server apparatus 200. The server apparatus 200 includes a processor 201, a RAM 202, a ROM 203, an HDD 204, a network I/F 205, a display device 206, and an inputting device 207, which perform inputting and outputting of signals or data through a bus 210. Further, the control unit 220 includes the processor 201, the RAM 202, the ROM 203, the HDD 204, and the bus 210. A display operating unit 230 includes a display device 206 and an inputting device.

Since the processor 201, the RAM 202, the ROM 203 and the network I/F 205 are units that perform the same operations as those of the processor 101, the RAM 102, the ROM 103 and the network I/F 105 in the image forming apparatus 100, the description thereof is not repeated for brevity. The HDD 204 is an auxiliary storage unit that stores data or programs in a nonvolatile manner, and stores a program 252 and data 251. Further, the HDD 204 includes a sharing management database (DB) 253 that stores and manages information relating to print data.

Figure 4:
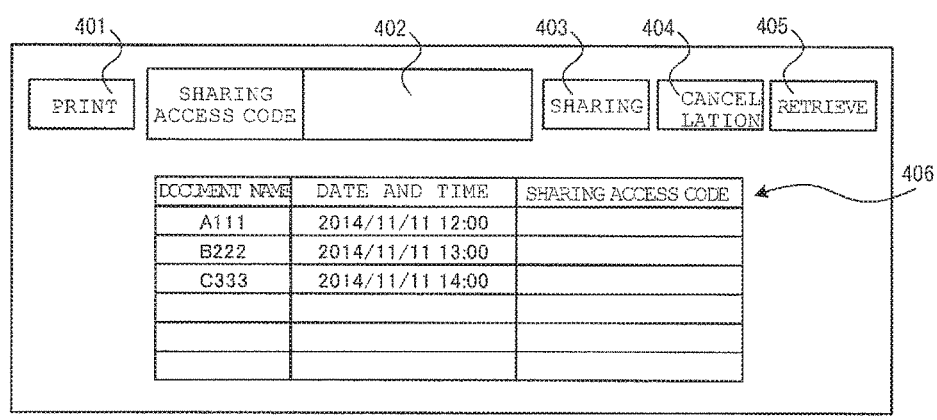
FIG. 4 is a diagram showing a display example in a display unit.
Figure 5:
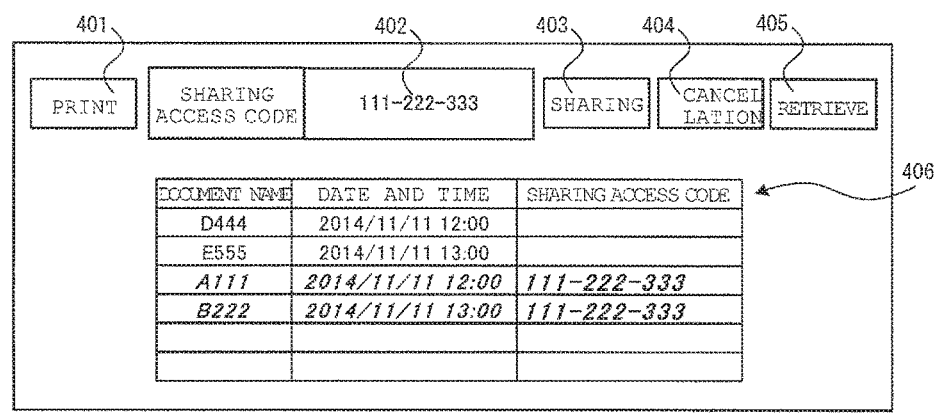
FIG. 5 is a diagram showing an example of a data structure stored in a sharing management database according to the embodiment.

FIG. 4 and FIG. 5 show display screen images displayed on the touch panel display 106 of the image forming apparatus 100, a display device 206 of the server apparatus 200, or a display unit of the client apparatus 300, and FIG. 6 to FIG. 9 are diagrams showing an example of state transition of tables of the sharing management DB 253. As for FIG. 4 and FIG. 5, the embodiment describes that the image forming apparatus 100 performs the display operation.

Firstly, a description is made with reference to FIG. 4. The touch panel display 106 includes a print button 401, a sharing access code inputting space 402, a sharing button 403, a cancellation button 404, a retrieve button 405 and a list space 406. If a user whose user ID is AAAAA finishes an authentication processing performed by the server apparatus 200, the processor 101 of the image forming apparatus 100 operates the network I/F 105 to acquire a record data correlated to user ID AAAAA, the record data being stored in the sharing management DB 253 of the server apparatus 200.

Herein, the stored data of the sharing management DB 253 is described. As shown in FIG. 6, the sharing management DB 253 is configured such that one record contains each column for a unique ID, a registered user ID, a sharing access code, a code issue time, a document name, a path and a register time. Herein, the unique ID corresponds to data that uniquely determines a registered data, and the registered user ID corresponds to user identification information relating to a user who registers (job inputting) the related print data. The sharing access code corresponds to a code which is used when an access to the related print data is interrogated or performed, and the code is set by a user who registers the related print data. The code issue time corresponds to information including a date and time when the sharing access code is issued. The document name corresponds to a document name of print data, for example, a file name. The path corresponds to information relating to a location (path name) storing substantial data of print data. The register time corresponds to information including a date and time when print data is registered.

After acquiring data correlated to the user ID AAAAA, the processor 101 causes the touch panel display 106 to display the acquired data. In other words, the touch panel display 106 displays, on the list space 406, the print data to which the user A may have access (see FIG. 4). If the user A selects one piece or plural pieces among the print data displayed on the list space 406 and subsequently activates a corresponding print button 401 associated with the selected print data, the image forming unit 109 prints the selected print data.

Further, if the user A selects the print data in the list space 406, and inputs a code in the sharing access code inputting space 402 to subsequently activate the sharing button 403, the user A is capable of allocating the sharing access code to the selected print data. FIG. 7 shows an example in which a sharing access code is allocated to the print data of a document name "A111". The processor 201 of the server apparatus 200 acquires the sharing access code input to the touch panel display 106, and acquires a current data and time to cause the acquired information to be correlated to the registered user ID and to store the correlated information as shown in FIG. 7.

If the user A selects another print data, and again, inputs the same code as the above case to the sharing access code inputting space 402 to subsequently activate the sharing button 403, the another print data selected among the list space 406 may be added. FIG. 8 is an example when the same sharing access code "111-222-333" is added to document name "B222". The processor 201 of the server apparatus 200 acquires the sharing access code input to the touch panel display 106, and acquires a current data and time to cause the acquired information to be correlated to the user ID and to store the correlated information as shown in FIG. 8. Further, in the embodiment, the code issue time of the print data which includes the same sharing access codes registered up to now is also updated to be this date and time (see the record of document name "A111" in FIG. 8).

FIG. 9 is an example when another sharing access code "222-333-444" is allocated to document name "C333". As such, the user A may allocate different sharing access codes to individual print data.

As shown in FIG. 4, if the user A inputs registered codes to the sharing access code inputting space 402 to subsequently activate a cancellation button 404, the processor 201 of the server apparatus 200 sets NULL to the sharing access code column and the code issue time column relating to the print data having the related sharing access code, respectively to cancel the sharing access code column and the code issue time column. Alternatively, if the user A selects one piece or plural pieces of the print data displayed in the list space 406 to subsequently activate the cancellation button 404, NULL is set to the sharing access code column and the code issue time column relating to the related print data, respectively to cancel the sharing access code column and the code issue time column. For example, if the cancellation operation is performed on the print data of the document "C333" in the state of FIG. 9, the state of FIG. 9 returns to the state of FIG. 8.

Hereinafter, a scheme in which other user has access to the print data having a set sharing access code is described with reference to FIG. 5. FIG. 5 shows a screen image when a user B performs an operation. A user B inputs, into the sharing access code inputting space 402, a sharing access code which is notified from the user A through any one of means such as an oral notification, a written memo or E-mail, to subsequently activate a retrieve button 404. According to this, the touch panel display 106 displays, on the list space 406, the print data to which the code coinciding with the input sharing access code is allocated. In the embodiment, the touch panel display 106 displays not only the user B's print data but also the user A's print data coinciding with the code "111-222-333" which user A sets.

Figure 10:
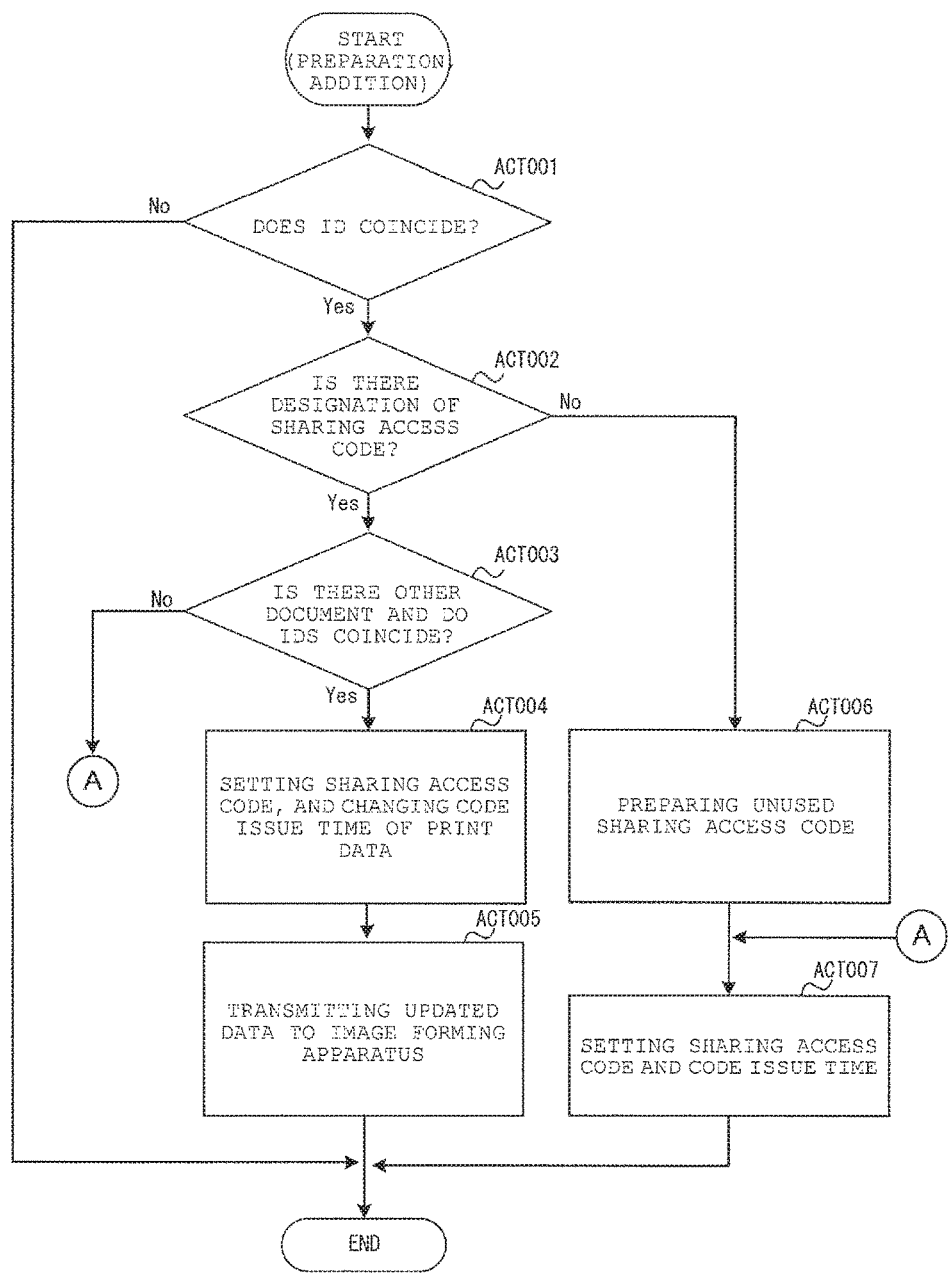
FIG. 10 is a flow chart showing operation examples of one embodiment (preparation processing and addition processing).

FIG. 10 is a flow chart showing operation examples when preparing (newly allocating) and adding a sharing access code, which are performed by the server apparatus 200. Further, the processor 201 of the server apparatus 200 executes computing the program 252 in collaboration with each piece of hardware to achieve each operation in flowcharts shown in FIG. 10 and the sequential drawings.

When the touch panel display 106 of the image forming apparatus 100 is used to activate the sharing button 403, the image forming apparatus 100 transmits an instruction telegram that indicates the sharing, data that uniquely determines the print data (for example, a unique ID) and a code that is applied when the code is described in the sharing access code inputting space 402, to the server apparatus 200. FIG. 10 corresponds to the operation after the server apparatus 200 receives the telegram data.

The processor 201 determines whether or not there is print data which coincides with the user ID (referred to as log-in ID) that uses the image forming apparatus 100 (ACT 001). If there is no the print data which coincides with the user ID (ACT 001, No), the processing ends.

If there is the print data which coincides with the user ID (ACT 001, Yes), the processor 201 determines whether or not a sharing access code is included in the transmitted telegram, and determines whether or not there is designation of a code (ACT 002).

When there is no designation of the sharing access code (ACT 002, No), the processor 201 prepares unused sharing access code based on data stored in the sharing management DB 253 (ACT 006). The processor 101 sets the prepared sharing access code and a current date and time in a user designated record of sharing management DB 253 (ACT 007). In other words, the processor 101 causes the sharing access code and the code issue time to correlate to a user ID of which the user registers the print data, and causes the correlated result to be stored in the HDD 204.

When there is the designation of the sharing access code (ACT 002, No), subsequently, the processor 201 determines whether or not there is other print data which coincides with the designated sharing access code and also the registered user ID of the other print data coincides with the log-in ID (ACT 003). When ACT 003 is negative (ACT 003, No), the processor 201 sets the sharing access code and the code issue time with respect to the related print data in the sharing management DB 253 (ACT 007). Further, the flow from the ACT 003-No to ACT 007 corresponds to an operation in which the sharing access code and the code issue time are set to only the currently designated print data.

When ACT 003 is positive (ACT 003, Yes), the processor 201 causes the sharing access code to be set to the newly shared print data, and causes the code issue time relating to the entire print data having the same sharing access code to be changed into the current date and time (ACT 004). The flow from ACT 003-Yes to ACT 004 corresponds to an operation in which the print data is added using the sharing access code which already exists. The processor 201 controls the network I/F 105 to transmit the updated record data to the image forming apparatus 100 (ACT 005).

Figure 11:
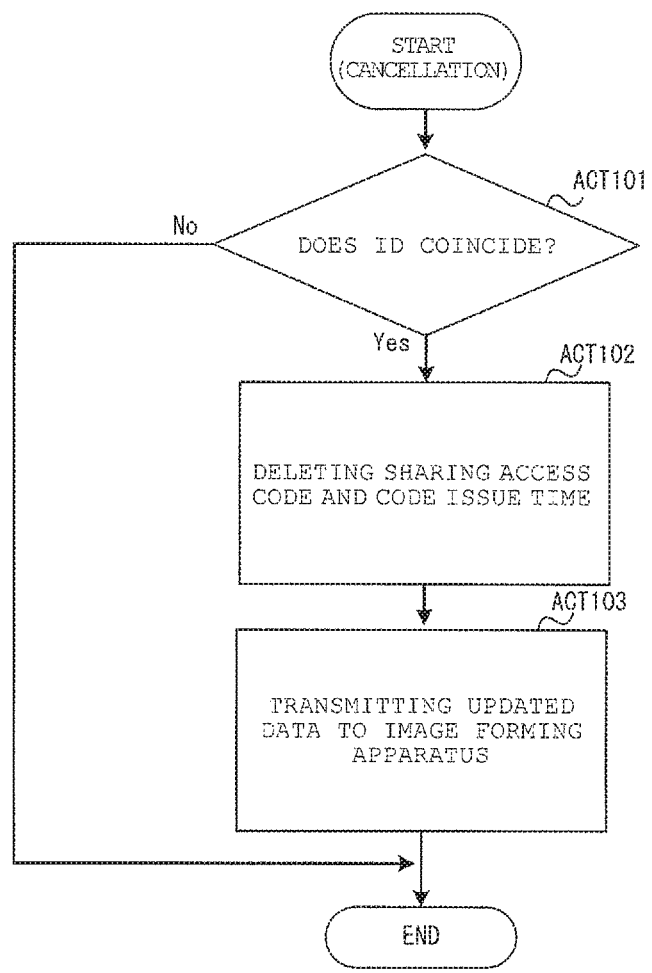
FIG. 11 is a flow chart showing an operation example of one embodiment (deletion processing).

FIG. 11 is a flow chart showing operation example of the server apparatus 200 when the sharing access code is cancelled. When the touch panel display 106 of the image forming apparatus 100 is used to select the print data and push the cancellation button 404, the image forming apparatus 100 transmits, to the server apparatus 200, an instruction telegram that indicates the cancellation, and the data that uniquely determines the print data. FIG. 11 corresponds to an operation after the server apparatus 200 receives the telegram data.

The processor 201 determines whether or not there is print data which coincides with the log-in ID (ACT 101). When there is no the print data which coincides with the log-in ID (ACT 101, No), the processing ends. The processor 201 deletes the sharing access code and the code issue time from the record of the designated print data (ACT 102). The processor 201 controls the network I/F 105 to transmit the updated code data to the image forming apparatus 100 (ACT 103).

Figure 12:
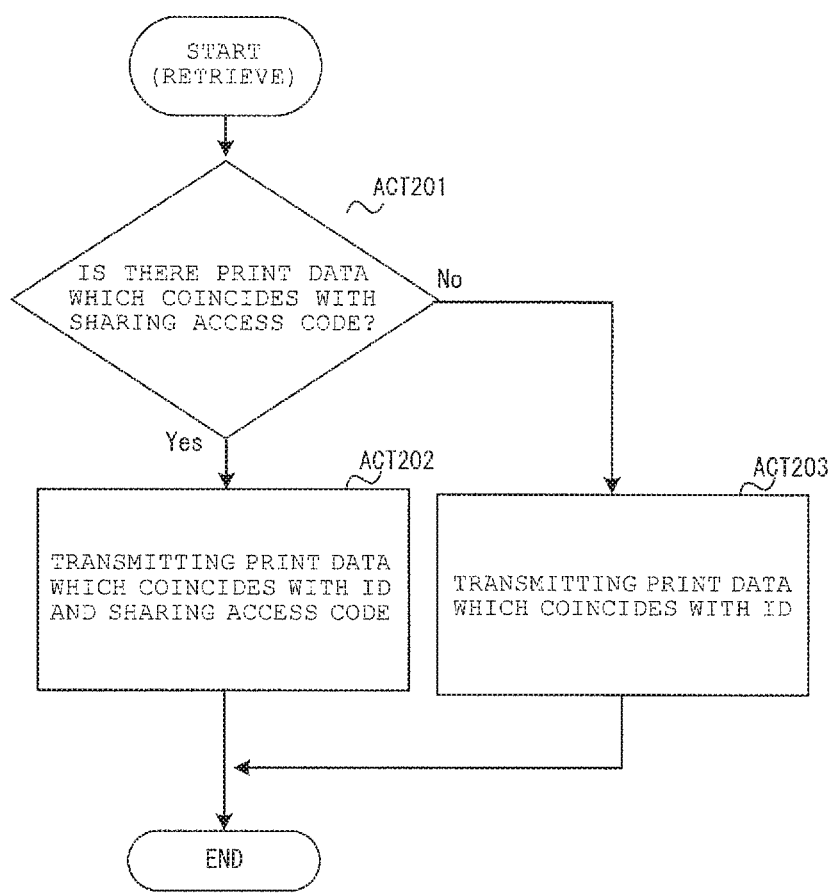
FIG. 12 is a flow chart showing an operation example of one embodiment (retrieve processing).

FIG. 12 is a flow chart showing operation example of the server apparatus 200 when a user retrieves the accessible print data. When the touch panel display 106 of the image forming apparatus 100 is used to push the retrieve button 403, the image forming apparatus 100 transmits, to server apparatus 200, an instruction telegram that indicates the retrieve, and a code which corresponds to an input code when the sharing access code is input. FIG. 11 corresponds to an operation after the server apparatus 200 receives the telegram data.

The processor 201 determines whether or not there is a code, which coincides with the sharing access code existing in the received telegram data, in the sharing management DB 253 (ACT 201). When there is the print data which coincides with the sharing access code (ACT 201, Yes), the processor 201 controls the network I/F 205 so as to transmit, to the image forming apparatus 100, the related print data which coincides with the sharing access code and another print data which coincides with the related user ID (ACT 202). On the other hand, when there is no the print data which coincides with the sharing access code (ACT 201, No), the processor 201 controls the network I/F 205 so as to transmit, to the image forming apparatus 100, only the print data which coincides with the related user ID (ACT 203). The image forming apparatus 100 displays the print data on the touch panel display 106.

Figure 13:
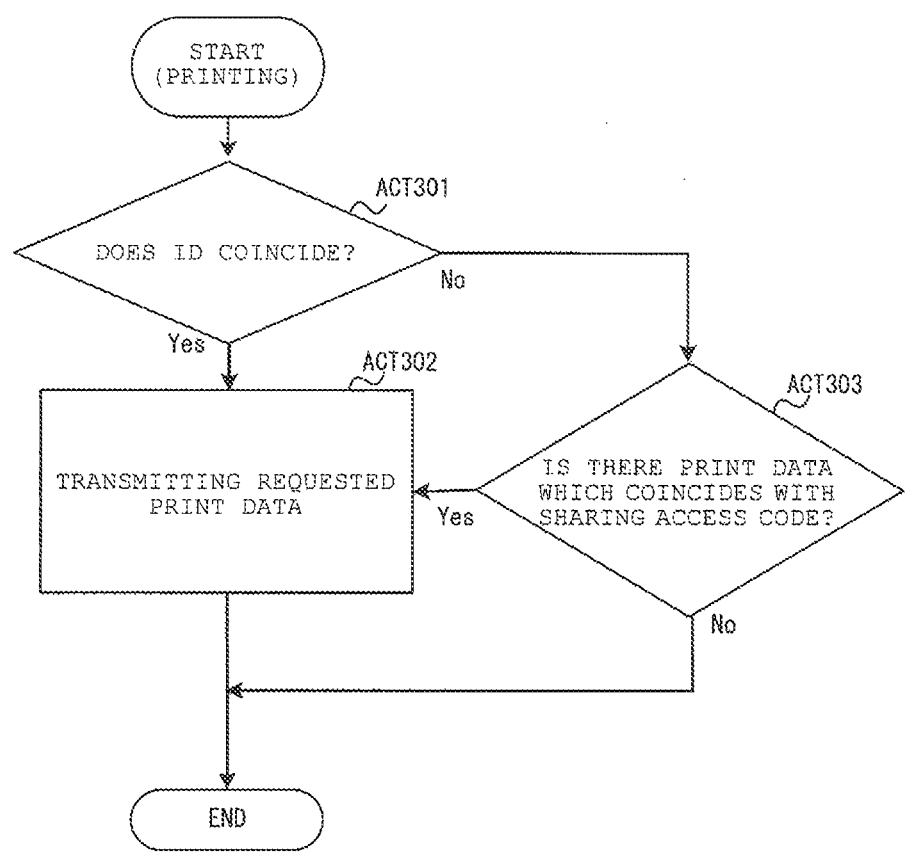
FIG. 13 is a flow chart showing an operation example of one embodiment (print processing).

FIG. 13 is a flow chart showing operation example of the server apparatus 200 when the printing is performed. When the touch panel display 106 of the image forming apparatus 100 is used to activate the print button 401, the image forming apparatus 100 transmits an instruction telegram that indicates the printing and data that uniquely determines the selected print data, to the server apparatus 200. In this case, when the print data having a sharing access code designated by the other party is selected, the designated sharing access code is also transmitted.

The processor 201 determines whether or not the selected print data coincides with a log-in ID (ACT 301). When where the selected print data coincides with the log-in ID (ACT 301, Yes), the processor 201 refers to the sharing management DB 253 to acquire the substantial file relating to the print data, and thus causes the network I/F 205 to operate and transmit the related substantial data (ACT 302). On the other hand, when the selected print data does not coincide with the log-in ID (ACT 301, No), the processor 201 refers to the sharing management DB 253 to determine whether or not there is any print data which coincides with the received sharing access code (ACT 303). When the processor 201 determines that there is the print data which coincides with the received sharing access code (ACT 303, Yes), the processing is performed in ACT 302, whereas when there is no the print data which coincides with the received sharing access code (ACT 303, No), the processing ends. Further, the image forming apparatus 100 which receives the print data forms images on the sheet based on the obtained print data. Further, when plural pieces of the print data are designated, all of the designated print data is printed. According to this configuration, the print data stored in the server in the manner of sharing with other parties may be printed.

The above embodiments describe the case where the functions for performing each aspects are previously recorded in the internal portion of the apparatus. However, the invention is not limited thereto, but may provides a configuration in which the same function is downloaded to the apparatus through a network, or a configuration in which the same function stored in the recording media is installed onto the apparatus. The recording media may be any type as long as the media may cause programs be stored in CD-ROM and the like, and the stored program may be read out by the apparatus through the media. As such, the previously installed function or the function obtained by a download may be achieved in collaboration with operating system (OS) and the like existing in the internal portion of the apparatus.

According to one aspect of the embodiments, the print data may be shared with another party, and also it is possible to improve usability of the related system.

While certain embodiments have been described, these embodiments have been presented by way of example only, and are not intended to limit the scope of the inventions. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus comprising:
a network interface configured to communicate with a server apparatus, the server apparatus stores print data and a printed information relating to the print data, by relating a user ID and a sharing access code,
a display unit configured to display an inputting space for inputting the sharing access code, print information relating to the print data, a sharing button for directing correspondence with the print information relating to the print data and the sharing access code, and a retrieve button for directing search of the sharing access code, and
a control unit configured to:
display print information corresponding to the user ID is received from the server apparatus on the display unit
transmit print information selected from the displayed print information and an inputted sharing access code to the server apparatus,
transmit an inputted sharing access code to the server apparatus when the retrieve button is operated, and
display the print information relating to the print data corresponding to the sharing access code transmitted from the server apparatus on the display unit.

2. The image forming apparatus according to claim 1, wherein the display unit displays the print information relating to the print data, the sharing button, and the retrieve button on a same screen.

3. The image forming apparatus according to claim 1, wherein the display unit displays the print information corresponding to the user ID, and the print data corresponding to the sharing access code on a same screen.

4. The image forming apparatus according to claim 1, wherein
the display unit further displays the print button for directing printing of the print data corresponding to the print information selected in the screen,
when the print button is operated, the control unit transmits the selected print information to the server apparatus and controls printing of the print data corresponding to the selected print information transmitted from the server apparatus.

\* \* \* \* \*